Dec. 22, 1964   F. BRÜMMER   3,162,077
APPARATUS FOR THE PRODUCTION OF OBJECTS
FROM SHEET MATERIAL
Filed May 22, 1961   4 Sheets-Sheet 1

FRIEDRICH BRÜMMER
INVENTOR
BY

Dec. 22, 1964  F. BRÜMMER  3,162,077
APPARATUS FOR THE PRODUCTION OF OBJECTS
FROM SHEET MATERIAL
Filed May 22, 1961  4 Sheets-Sheet 2
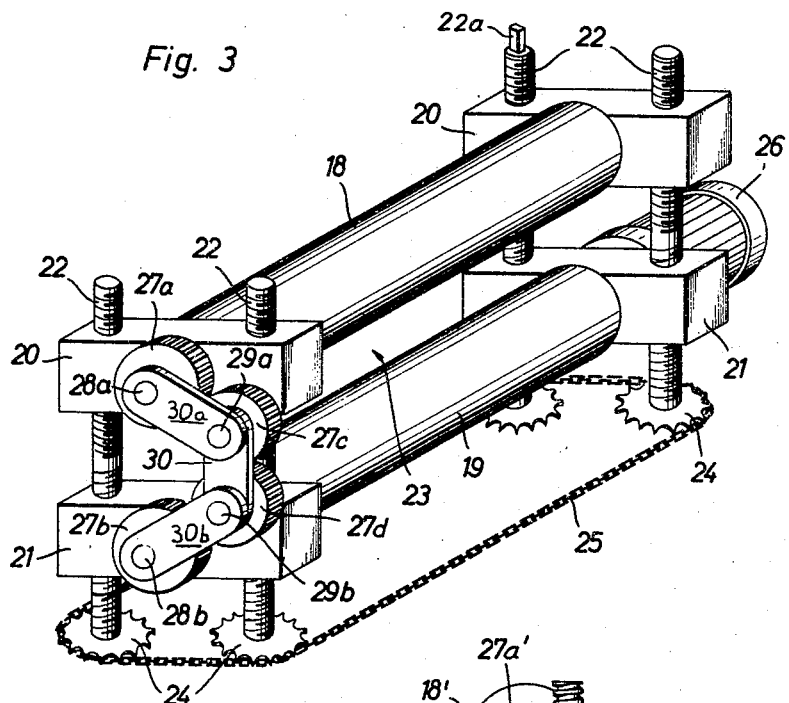
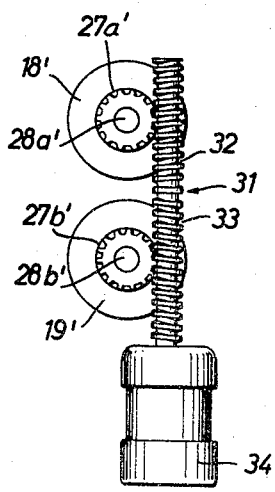
FRIEDRICH BRÜMMER
INVENTOR
BY Dec. 22, 1964   F. BRÜMMER   3,162,077
APPARATUS FOR THE PRODUCTION OF OBJECTS
FROM SHEET MATERIAL
Filed May 22, 1961   4 Sheets-Sheet 3
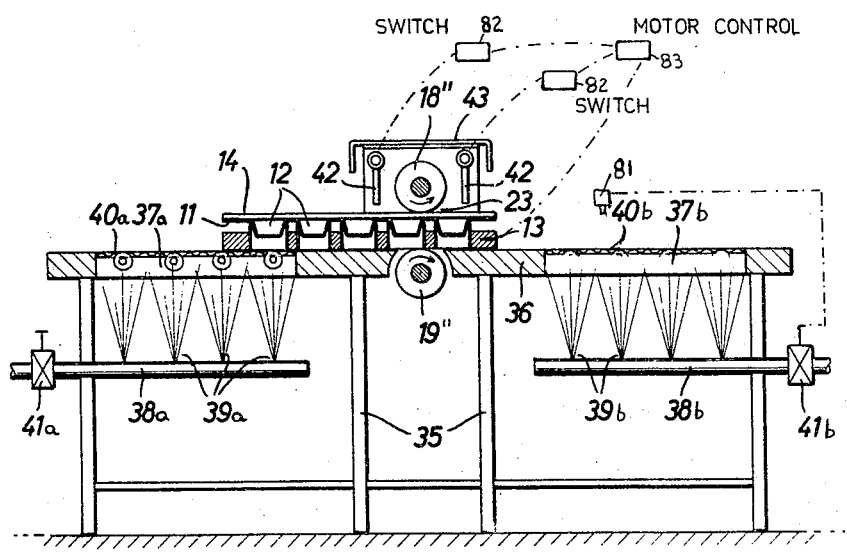
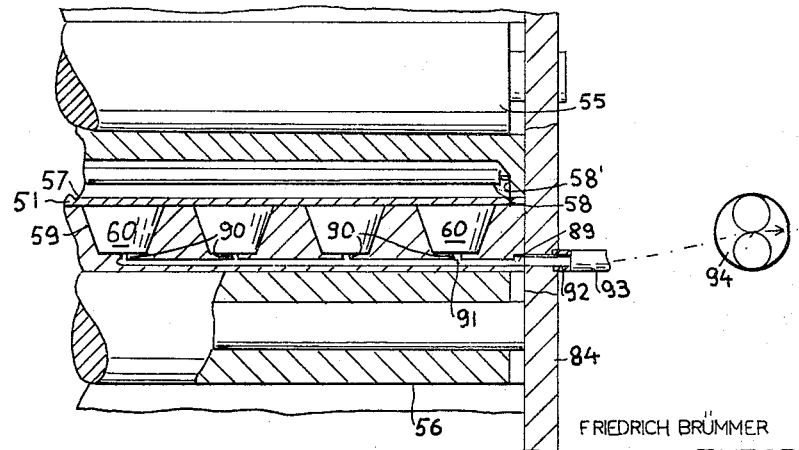
FRIEDRICH BRÜMMER
INVENTOR
BY

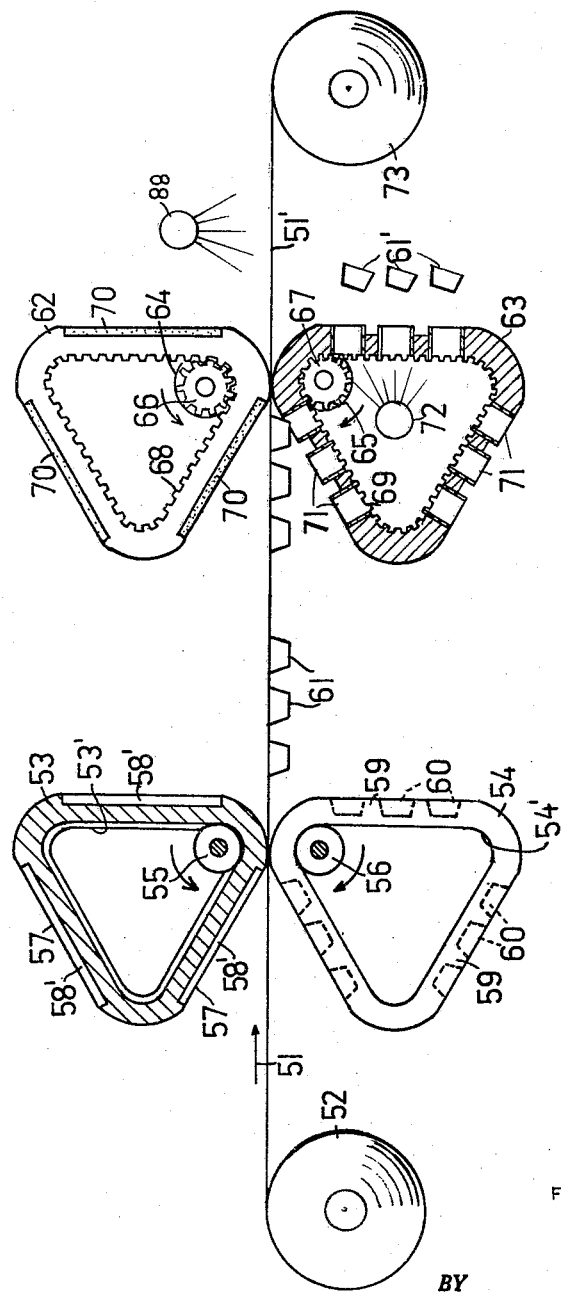

United States Patent Office 3,162,077
Patented Dec. 22, 1964

3,162,077
APPARATUS FOR THE PRODUCTION OF OBJECTS FROM SHEET MATERIAL
Friedrich Brümmer, Dinkelsbuhl, Germany, assignor, by mesne assignments, to Rudolf Brümmer, Dinkelsbuhl, Germany
Filed May 22, 1961, Ser. No. 111,529
Claims priority, application Germany May 23, 1960
5 Claims. (Cl. 83—99)

My present invention relates to the production of relatively thin-walled articles, such as packaging containers, liquid receptacles, baking molds and the like, from sheet material and, more particularly, to an apparatus for separating such articles from the sheet and/or forming them therefrom.

While it is known to form various articles from a sheet of material to which they remain attached via a web of the material subsequently to the initial forming step, the methods by which such formation conventionally takes place are rendered inefficient by the necessity of providing an additional step wherein the articles are separated from the web by suitable cutting means. Hitherto, the aforementioned cutting means included relatively large platen presses whereby the required number of blades were forced against the sheet material at high pressures to sever the objects from the webs. Not only were such cutting means expensive and inordinately complex, but, in addition, they also often yielded poor results owing to wear of the cutting members.

It is, therefore, an object of the invention to provide an improved relatively inexpensive, apparatus for shaping thin-walled receptacles and the like from sheet material and/or separating the receptacles therefrom.

According to a feature of the invention, a sheet or foil of preferably thermosoftening material is formed with a series of integral protuberances, having the desired configuration, which are severed from their supporting web of sheet material by sandwiching the sheet or foil between a cutting plate and a backing plate and thereafter successively applying pressure to different blade portions of the cutting plate respectively encircling these protuberances, thereby progressively detaching the latter from the remainder of the sheet. This is advantageously accomplished by passing the entire combination of foil, cutting plate and backing plate between a pair of inversely rotatable pressure elements such as rollers whose mutual separation is so dimensioned at to be approximately equal to the sum of the thicknesses of the plates so that the unit passed between the rollers is compressed by a distance substantially equal to and preferably somewhat greater than the thickness of the foil.

While almost any synthetic resinous sheet material may be processed in accordance with the above method, I prefer to employ thermoplastic materials, such as polyvinyl chlorides and similar vinyl compounds and especially hard polyvinyl chlorides, which may be readily shaped by deep-drawing techniques as described below prior to severing and consequent removal of shaped articles from the supporting web.

Whereas the cutting plate is preferably rigid and relatively massive, the backing plate is yieldably resilient to insure accommodation of the unit between the compression rollers and to guarantee a small slippage between the cutting plate and the backing plate so that the cutting edges in their successive passes do not always engage the identical portion of the backing plate and cause inordinate wear of the latter. Thus, the backing plate may be composed of a thermoplastic or some other synthetic resin.

The shaping operation preferably includes the steps of superimposing the thermosoftening sheet material upon an anvil formed with a series of recesses having the desired configuration, heating the sheet material and progressively applying suction to the recesses, thereby drawing respective portions of the sheet material into the latter. The articles formed in this manner may be severed from their supporting web of material by the aforedescribed process.

According to another feature of the invention, an apparatus for shaping thin-walled articles from sheet material and/or severing them from the sheet material comprises the aforementioned compression rollers and means for adjusting the spacing therebetween and for maintaining them parallel in all positions of adjustment. The adjustment means may include adjustable spacing members at each end of the rollers coupled together for identical operation in unison by suitable transmission means. Moreover, the rollers are, preferably coupled together for rotation with substantially identical peripheral speeds. The aforedescribed apparatus may also be provided with suitable blower means adapted to dislodge the cut-out shaped portions from the web and disposed rearwardly of the rollers along the advance of the sheet material. While the latter may comprise individual sheets, it is also possible to form the apparatus with continuously operable shaping and cutting stages supplied from a roll or coil of the sheet material. Thus, the cutting plate and/or the backing plate of the cutting apparatus is according to a more specific feature of the invention, formed as an endless band or a polygonal drum having a plurality of planar working surfaces.

The above and other objects, features and advantages of my present invention will become more readily apparent from the following description, reference being made to the accompanying drawing in which:

FIG. 3 is a perspective view of a roller pair suitable for use in a cutting apparatus according to the invention;

FIG. 4 is a somewhat diagrammatic end-elevational view of another roller pair, showing the drive means therefor;

FIG. 5 is a side-elevational view, partly in longitudinal section, of apparatus according to the invention utilizing the rollers of FIG. 3;

FIG. 6 is a view similar to FIG. 5 diagrammatically illustrating another embodiment of the invention; and FIG. 7 is an enlarged transverse cross-sectional view of a detail of the apparatus of FIG. 6.

Figure 1:
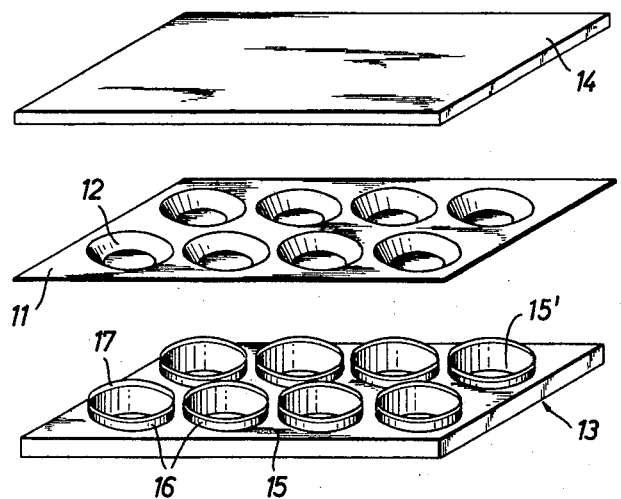
FIG. 1 is a perspective view of a cutting assembly according to the invention, with the elements thereof shown spaced apart for clarity.

In FIG. 1 I show a thermoplastic sheet or foil 11 preformed with cup-shaped protuberances 12 which are to be severed from their supporting web. A cutting plate 13 underlies the foil 11 at the convex side of the protuberances 12 and a backing plate 14 of resiliently yieldable material is superimposed thereon at their concave side. The cutting plate 13 comprises a rigid and preferably massive support portion 15 with perforations 15′ and a plurality of upstanding blades 16 surrounding the perforations, in the form of hardened metal strips of annular configuration, adapted to be aligned with the circular receptacle portions 12 of the sheet 11. The sharpened upper edges 17 of these blades register with the edges of the receptacle portions 12 merging with the planar portion of the sheet.

Figure 2:
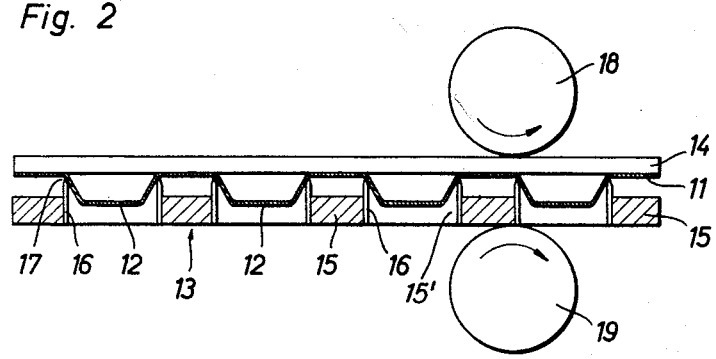
FIG. 2 is a longitudinal cross-sectional view illustrating the process of the invention.

As indicated in FIG. 2, the assembly of cutting plate 13, backing plate 14 and sheet or foil 11, sandwiched therebetween, is inserted into the gap between a pair of rollers 18 and 19 (shown in greater detail in FIG. 3) whose spacing is such as to compress the assembly by a distance slightly greater than the thickness of the foil 11.

The press rollers 18 and 19 are each journaled in a respective pair of axailly spaced blocks 20 and 21 aligned with the journal blocks of the other roller. The journal blocks 20, 21 at each end of the roller pair are traversed by a pair of threaded spindles 22. The latter are formed with oppositely threaded upper and lower portions engaging the blocks 20, 21 for displacing them toward or away from each other upon rotation of the spindles to adjust the spacing between the rollers 18 and 19. The spindles 22 are provided with respective, substantially coplanar sprocket wheels 24 which are interconnected by an endless chain 25 for the simultaneous rotation of all the spindles 22 upon the rotation of any one of them to maintain the rollers 18 and 19 parallel regardless of the spacing therebetween. One or more of the spindles 22 are provided with a polygonal head 22a engageable by a wrench for adjusting manually the inter-roller spacing 23.

Roller 19 is driven by a motor 26 mounted upon one of its journal blocks 21 and is coupled with the roller 18 for simultaneous opposite rotation at the identical speed by a suitable transmission permitting adjustment of the roller spacing 23. The transmission includes a gear 27b secured to the shaft 28b of lower roller 19, a gear 27a secured to the shaft 28a of upper roller 18, and a pair of meshing idler gears 27c and 27d, carried on pins 29a and 29b, which engage respectively the gears 27a and 27b of the rollers, joined together by a link 30. Each extremity of the latter is pivoted by one of the pins 29a, 29b to a link 30a, 30b swingable about the axis of a respective roller 18, 19. The link bars 30, 30a and 30b constitute a trapezoidal linkage adapted to permit adjustment of the inter-roller spacing 23 while maintaining precise synchronization of the rotation of the rollers.

In FIG. 4 I show another method of synchronizing the rotation of the rollers while permitting spacing adjustment. The two rollers 18' and 19' are held in parallel alignment and are vertically adjustable by means such as the journal blocks 20, 21 and spindles 22 described with reference to FIG. 3. Each gear 27a' and 27b', respectively secured to the shafts 28a' and 28b' of rollers 18' and 19', meshes with a worm portion 32 and 33 of a shaft 31 driven by a motor 34. The worm portions 32 and 33, are inversely threaded to rotate the rollers 18' and 19' synchronously in opposite senses.

FIG. 5 illustrates a complete cutting apparatus according to the invention wherein a pair of rollers 18", 19", similar to the rollers 18 and 19, are journaled in a frame 35. Only roller 18" is, however, vertically displaceable for adjustment of the inter-roller spacing. The frame 35 also carries a work table 36, whose upper surface is tangent to the lower roller 19", formed with two large throughgoing openings 37a, 37b adjacent the roller assembly 18", 19". To facilitate the displacement of the massive cutting plate 13 with the foil 11 and the backing plate 14 superimposed thereon along the work table 36, a plurality of transport rollers 40a, having axes substantially parallel to those of rollers 18", 19", are disposed in opening 37a along the transport path of the cutting- and backing-plate unit 11, 13 and 14 tangential to the upper surface of the table 36 or with a peripheral portion extending slightly thereabove. The other opening 37b in table 36 may be provided with rollers similar to the rollers 40a or, as shown, with a screen or grate 40b. Compressed-air pipes 38a and 38b with upwardly directed nozzles 39a and 39b are respectively disposed below the openings 37a and 37b for producing upward air jets adapted to pass between the spaced-apart transport rollers 40a and through the grate 40b to dislodge the severed cup blanks 12 from the sheet 11 upon completion of the cutting operation and, if necessary, upon removal of the backing plate 14. While pipe 38a is provided with a manually operable control valve 41a, pipe 38b is preferably provided with a remotely controlled valve 41b actuable by the cutting unit 11, 13 and 14 via the switch 81 to initiate automatically a compressed-air blast when the cutting unit is discharged from between the rollers 18", 19" along the grate 40b upon the conclusion of the cutting operation. A safety device in the form of a pair of flaps 42, swingably positioned along the roller 18", is provided to prevent entrainment of portions of the operator's apparel or body between the compression rollers. The protective flaps 42 are each coupled with a switch 82 adapted to operate the motor control 83 to halt the rotation of the rollers 18", 19" upon the inward displacement of one of the flaps 42. A protective hood 43 covers the top portion of the roller assembly 18", 19" and flaps 42.

In operation, the cutting plate 13 (FIG. 2) is placed upon the left-hand portion of table 36 (FIG. 5) and a foil 11, having proturberances 12 registering with the blades 16 of the cutting plate, is disposed thereon. The backing plate 14 is positioned upon the foil 11 and the thus constituted cutting unit is shifted along the transport rollers 40a to the compression rollers 18", 19", under the pressure of which the shaped portions 12 are severed from the foil 11. Upon completion of the latter operation, the cutting unit is shifted further along the table 36 to the right-hand portion thereof, whereupon switch 81 is tripped to initiate a blast of air from the nozzles 39b which dislodges the blanks 12 severed from the foil 11. In the event that the cutting unit must be reversed because of a malfunction or a dangerous situation, or repeatedly reciprocated between the rollers 18" and 19" to insure complete cutting, the air blast from nozzles 39a may be employed to dislodge the receptacles 12 from the perforations 15' of plate 13 when the cutting unit is positioned upon the left-hand portion of table 36. Such reversal may be initiated automatically under the control of any conventional monitoring device not shown.

FIGS. 6 and 7 illustrate, somewhat schematically, apparatus for continuously producing cups or the like. A band 51 of thermosoftenable material, such as polyvinyl chloride, is unrolled from a coil 52 thereof and passed successively through a shaping stage, wherein a plurality of cups 61 are formed in the band, and a cutting stage, wherein the cups 61 are severed from their supporting web 51' before the latter is wound onto another coil 73.

The shaping stage comprises a pair of rollers 55, 56, disposed on opposite sides of the moving band 51 with parallel axes extending thereacross, journaled in opposite walls (one of which is shown at 84 in FIG. 7) of a suitable housing, not shown. Roller 56 engages the inner surface 54' of a trigonal hollow drum 54 whose planar external anvil surfaces 59 are formed with cup-like shaping recesses 60, while roller 55 likewise engages the inner surface 53' of a similar hollow drum 53 whose planar outer surfaces 57 are each formed with a relatively shallow recess 58'. Each recess 58' is provided with an array of conventional resistance-heating rods 58 (FIG. 7). Rollers 55 and 56 rotate synchronously so that the planar portions 53' and 54' of their respective drums 53, 54 close onto the band 51 from opposite sides substantially simultaneously and are displaced along with the band, between their rollers 55 and 56, during the forming operation; it will be apparent that this displacement occurs along parallel planes which are transverse to the plane including the axes of the two rollers.

The cutting stages of the apparatus includes a pair of compression rollers 64, 65, formed rigid with respective pinions 66 and 67 which mesh with racks 68 and 69 provided along the inner surfaces of a pair of trigonal hollow drums 62, 63 respectively traversed by the compression rollers 64 and 65. The latter may be adjustable and are, preferably, driven substantially synchronously as described with respect to the rollers 18 and 19. Pinions 66 and 67 and their complementary racks 68 and 69 prevent slippage between the rollers and the drums. If desired, a similar positive engagement could be provided between rollers 55, 56 and drums 53, 54 at the upstream side of the sheet path. It will be noted that each of the four drums shown in FIG. 6 has a polygonal (i.e. triangular) outer periphery and a geometrically similar inner periphery, is of uniform wall thickness, and is rounded at each corner of the polygon with an inner curvature whose radius equals that of its respective driving roller 55, 56 or 65, 66; the roller diameter, in turn, is considerably smaller than the width of each flat surface of the inner drum periphery.

The planar outer faces of drum 62 are formed as resiliently yieldable pads or plates 70 whereas the corresponding faces of drum 63 are formed as cutting plates and provided with cylindrical blades 71 for severing the individual cup-shaped blanks 61 from the band, the peripheral drum wall having perforations surrounded by the blades 71. Since the resulting cups 61' may tend to become lodged in the openings defined by the blades 71, I dispose a nozzle 72 within the drum 63 for directing a stream of fluid under pressure against the inner surfaces of the drum for ejecting articles 61' entrained thereby. Another nozzle 88 is directed against the web 51' for dislodging any of the cup-like articles 61' which might have remained therein.

In operation, a portion of the band 51 is clamped between the planar outer surfaces of the drums 53 and 54 of the shaping stage and travels along with these surfaces. Heat radiated by the elements 58 (FIG. 7) softens the clamped portion of the thermoplastic band 51 as the planar portions of the drums are displaced linearly along the path of the band. The cup-forming recesses 60 aligned along a generatrix of the drum 54 are provided with respective bores 90 which terminate in a common manifold 91. The latter opens at 89 onto the housing wall 84 adjoining the drum 54 and is adapted to register with a bore 92 in the wall 84. Bore 92 is connected via a tube 93 with a vacuum pump 94. Thus, when the clamped portion of band 51 is heated sufficiently, a bore 89 in the vicinity of the heated portion registers with the bore 92 and the recesses 60 connected with this bore are evacuated, thereby drawing the heat-softened plastic band into the recesses. Subsequently, as the band portion with the formed cups 61 is displaced further, the aforementioned bore 89, no longer connected with the suction source, is, instead, opened to the atmosphere to release the blanks 61 of the band and to permit the latter to travel to the cutting stage.

In the cutting stage, the band 51 is clamped between the resilient plate 70 and cutting blades 71 of the drums 62 and 63, respectively, whereupon the cutting unit thus formed is compressed between the rollers 64 and 65 and advances therebetween along with the band to sever the cups 61' from the web 51'. The latter is wound into coil 73. The severing operation is essentially identical with that previously described.

The invention as described and illustrated is believed to admit of many modifications and variations deemed to be included within its spirit and scope as claimed and to be readily apparent to persons skilled in the art. Thus, for example, whereas the cutters 16 and 71 have been shown to engage the frustoconical protuberances 12 or 61 without clearance, it will also be possible to increase their inner diameters over the outer diameters of the frustocones so as to provide the finished cups with a brim of greater or lesser width. Also, particularly in the case of articles of small size, the resilient backing layer need not be on a separate plate but may be part of the roller (e.g. 18) against which the sheet is pressed on the concave side of its protuberances.

I claim:
1. In an apparatus for cutting blanks from sheet material, in combination, a pair of co-operating compression elements, one of said elements including a drum with an outer polygonal periphery forming flat outer surfaces and an inner polygonal periphery geometrically similar to said outer periphery whereby flat inner surfaces are formed, said peripheries being separated by a wall of constant thickness arcuately curved at the corners of the polygon; supporting means for said drum enabling successive displacement of its surfaces within a given plane, said supporting means including a roller extending axially within the drum in contact with its inner periphery, said roller having a diameter substantially less than the width of each of said inner surfaces; each of said surfaces being provided with upstanding blade means of closed configuration positioned for contact with the other of said elements upon displacement in said plane, thereby severing corresponding portions of a sheet passing between said elements.

2. In an apparatus for cutting blanks from sheet material, in combination, a pair of co-operating compression elements, one of said elements including a drum with an outer polygonal periphery forming flat outer surfaces and an inner polygonal periphery geometrically similar to said outer periphery, whereby flat inner surfaces are formed, said peripheries being separated by a wall of constant thickness arcuately curved at the corners of the polygon; supporting means for said drum enabling successive displacement of its surfaces within a given plane, said supporting means including a roller extending axially within the drum in contact with its inner periphery, said roller having a diameter substantially less than the width of each of said inner surfaces; the other of said elements having a resilient surface, each of said flat outer surfaces being provided with upstanding blade means of closed configuration positioned for contact with said resilient surface upon displacement in said plane, thereby severing corresponding portions of a sheet passing between said elements.

3. In an apparatus for cutting blanks from sheet material, in combination, a pair of co-operating compression elements each including a drum with an outer triangular periphery forming three flat outer surfaces and with an inner triangular periphery geometrically similar to said outer periphery whereby three flat inner surfaces are formed, said peripheries being separated by a wall of constant thickness arcuately curved at the corners of the polygon, and a roller extending axially within each drum in contact with its inner periphery, said roller having a diameter substantially less than the width of said inner surfaces for rotary entrainment thereof, the flat surfaces of both said drums being coextensive and of a width substantially exceeding the diameters of said rollers, said rollers having parallel axes for parallel displacement of successive pairs of corresponding surfaces of said drums along planes transverse to the common plane of said axes, the outer surfaces of one of said drums being provided with upstanding blade means of closed configuration for severing portions of a sheet passing between each pair of corresponding drum surfaces, the surfaces of the other of said drums being in contact with said blade means in the course of said parallel displacement.

4. In an apparatus for cutting blanks from sheet material, in combination, a pair of co-operating compression elements each including a drum with an outer triangular periphery forming three flat outer faces and with an inner triangular periphery geometrically similar to said outer periphery whereby three flat inner surfaces are formed, said peripheries being separated by a wall of constant thickness arcuately curved at the corners of the polygon; a roller extending axially within each drum in contact with its inner periphery, said roller having a diameter substantially less than the width of each of said inner surfaces for rotary entrainment thereof; the flat surfaces of both said drums being coextensive and of a width substantially exceeding the diameters of said rollers, said rollers having parallel axes for parallel displacement of successive pairs of corresponding surfaces of said drums along planes transverse to the common plane of said axes, each of the outer surfaces of one of said drums being perforated and provided with a plurality of upstanding blades of closed configuration surrounding its perforations for severing portions of a sheet passing between each pair of corresponding drum surfaces, the outer surfaces of the other of said drums being provided with resilient layers in contact with said blades in the course of said parallel displacement; and blower means in said one of said drums for dislodging severed sheet portions from said perforations.

5. In an apparatus for cutting blanks from sheet material, in combination, a pair of co-operating compression elements, each of said elements including a polygonal drum with flat surfaces and supporting means for each drum enabling successive displacement of its surfaces within a given plane, the flat outer surfaces of one of said drums being resilient, each of the flat surfaces of the other of said drums being substantially coextensive with said resilient surfaces and provided with upstanding blade means of closed configuration positioned for contact with said resilient surfaces upon displacement thereof in parallel planes, thereby severing corresponding portions of a sheet passing between said elements.

References Cited in the file of this patent
UNITED STATES PATENTS

| | | |
|---|---|---|
| 663,689 | Staley et al. | Dec. 11, 1900 |
| 1,378,860 | Heinle | May 24, 1921 |
| 1,447,105 | Thropp | Feb. 27, 1923 |
| 1,654,647 | Heist | Jan. 3, 1928 |
| 1,900,427 | Clapp et al. | Mar. 7, 1933 |
| 2,168,400 | Evers | Aug. 8, 1939 |
| 2,194,570 | Schafer et al. | Mar. 26, 1940 |
| 2,217,060 | Korsen | Oct. 8, 1940 |
| 2,219,578 | Pittenger | Oct. 29, 1940 |
| 2,523,153 | Shapiro | Sept. 19, 1950 |
| 2,526,811 | Dawson | Oct. 24, 1950 |
| 2,594,692 | Skillman | Apr. 29, 1952 |
| 2,640,371 | Rosenleaf | June 2, 1953 |
| 2,757,728 | De Lisi et al. | Aug. 7, 1956 |
| 2,891,280 | Politis | June 23, 1959 |
| 2,902,718 | Martelli et al. | Sept. 8, 1959 |
| 3,024,688 | Romm | Mar. 13, 1962 |

FOREIGN PATENTS

| | | |
|---|---|---|
| 1,072,871 | France | Mar. 17, 1954 |
| 171,098 | Sweden | Apr. 12, 1960 |